3,398,171
PROCESS OF PRODUCING ORGANOHALOSILANES
Albert P. Giraitis, Paul Kobetz, and Francis M. Beaird, Jr., Baton Rouge, La., assignors to Ethyl Corporation, New York, N.Y., a corporation of Virginia
No Drawing. Filed Mar. 2, 1964, Ser. No. 348,824
41 Claims. (Cl. 260—448.2)

ABSTRACT OF THE DISCLOSURE

The selective preparation of particular organo-halosilicon compounds at low temperatures of about −10 to 50° C. in certain stoichiometric relationships of reactants is described. A new stepwise substitution of halogens by organo groups is obtained. The low temperatures are retained through recovery operations.

---

This invention relates in general to the preparation of intermediates for organo-silicon products. In greater particularity, it relates to the production of organo-halosilanes such as dimethyldichlorosilane.

There are several known prior art processes whereby materials such as the foregoing can be produced. At the present time, however, the process of principal commercial interest is the so-called direct process by means of which organo-halosilanes are produced by the direct reaction of methyl chloride with silicon metal in the presence of a copper catalyst. This process is described for example in "Organic Silicon Compounds," C. Eaborn, Academic Press, Inc., 1960, page 36. As is well known and readily apparent from the foregoing reference material, this direct process does not produce solely the desired dialkyl-dihalosilane but rather produces a number of other silane combinations such as organothiohalosilane, triorganohalosilane, and tetraorganosilane. It is important to observe that this particular process is conducted at elevated temperatures such as 300–400° C. As a practical matter the conversion efficiency of this direct process in terms of material converted to the desired diorganodihalosilane is limited to approximately 65% with the balance being made up of approximately 15% organotrihalosilane, 5% triorganohalosilane, and 15% represented by higher and lower boiling materials. In conducting the direct reaction, combination in various stoichiometric proportions occurs as indicated by Eaborn at page 37. However, it is not possible to achieve control of the combination ratios or selectivity of the displacement of the halogen from any particular member of the organohalosilanes so that as a practical matter the foregoing 65:15:5 ratio is virtually a statistical matter which cannot be varied by any previously known technique.

Another prior art process for the preparation of organohalosilanes is the Grignard reaction in which an alkyl magnesium halide is combined with silicon tetrahalide in ether solution to produce dialkyldihalosilane together with other silanes, the yield of the desired material being of the order of 55%. As with the direct process, the conversion by the Grignard process is also a statistical matter and there is virtually no possibility of improving the production ratio for the desired material.

A further example of the prior art existing in this field is the article by D. T. Hurd in the Journal of Organic Chemistry, 13, 711–13 (1948) relating to the preparation of complex metal alkyls. In that article the reaction of LiAl(CH$_3$)$_4$ with silicon tetrachloride was described as methylation.

As will be brought out in the discussion that follows, mere methylation, broadly described, is not the important aspect of the present invention. The importance of the present invention lies in the teachings as to how controllable selective reaction can be attained and retained.

In connection with the foregoing publication of Hurd, it is appropriate to point out that at least as late as 1956, eight years subsequent to 1948, the direct process was still the mainstay of the industry as evidenced by Charles E. Reed, Edgar Marburg Lecture 1956, American Society for Testing Materials publication, "The Industrial Chemistry, Properties, and Applications of Silicones," pp. 16–18. It is believed that this situation of preminence of the direct process prevails in the industry ot this day, despite its shortcomings.

The yields of the typical prior art processes for the commercial production of diorganodihalosilanes are undesirably low and result in the production of excessive quantities of monohalo or monoorgano compounds.

U.S. Patent 2,859,229 is directed to the alkylation of lead chloride with mixed metal alkyls in which the only product is tetraalkyllead, there being no haloalkyllead combinations in the products. Additionally, it is to be observed that this typical prior art alkylation process results in the production of elemental lead and that the overall conversion to the tetraalkyllead compound is of the order of 50% of the lead employed. In other words, two molecules of lead chloride are employed to produce one molecule of tetraethyllead. It must be observed, however, that that process does not represent a loss of the lead involved since it is possible to utilize the lead for other purposes since it has special properties because of its high activity. The fact remains that that process which is considered typical of the mixed metal alkylation process as heretofore known has entirely different characteristics and purposes and does not result in the production of any material of the type now envisioned or desired.

A further example of the state of the art is German Patent 1,158,976 which shows that attempts are still being made to improve the direct process. It is noteworthy that the improvement obtained by that patent is of litle significance in comparison to that of the present invention.

It is accordingly an object of the present invention to provide an improved process by which organotrihalo, diorganodihalo, or triorganohalo compounds may be produced selectively at high efficiency.

Another object of the present invention is to provide a process for the production of diorganodihalosilanes with high efficiency from comparatively low priced raw materials.

Another object of the present invention is to produce dimethyldichlorosilane at high efficiency.

Other and further objects and features of the present invention will become apparent upon careful consideration of the following detailed description.

In accordance with the basic teachings of the present invention, selective production of organohalosilanes at high efficiency is accomplished by the reaction of a silicon tetrahalide under precisely controlled reaction conditions using particular bimetallic compounds AMR$_n$, as hereafter defined. As an adjunct to the basic teachings of this invention a recovery process is provided whereby the desired silanes are obtained without degradation thereof.

More specifically the present invention provides a process for the production of organohalosilanes in which a mixed metal compound AMR$_n$ having one metal (A) which is an alkali metal of atomic number 3–19, both limits inclusive, the other metal (M) selected from the group consisting of aluminum, boron, and zinc and containing an organic radical desired for the product is added to a halosilane having at least 2 halogen atoms bonded to the silicon atom while maintaining the reaction temperature from about −20° C. to about +50° C., the amount of said compound AMR$_n$ being 1 mol per mol equivalent of halogen being displaced from the silicon atom.

It is not generally recognized that recovery can be an important phase of the production of organohalosilanes. In the present process, however, some of the organohalosilanes will react further below usual distillation temperatures. Thus a significant part of the present invention is that, for certain materials, recovery is critical and must be performed with careful control of conditions to avoid destroying the selectivity attainable in the basic reaction.

Yields of desired diorganodihalosilanes of the order of 95% or better are readily obtained using the teachings of the present invention. Virtually complete selectivity as to the mol ratio of the organic components to the halogen components has been obtained. Thus it is possible to produce the desired diorganodihalosilane or any of the others starting from the silicon tetrahalide or a compound having a lesser ratio of halide to organo than the tetrahalide but which ratio is greater than that of the desired product.

It has been observed that the principal conventional prior art processes for diorgano-dihalosilane production identified in the foregoing as the direct process and the Grignard process produce significant quantities of by-product organotrihalosilane. By utilizing the teachings of the present invention it is possible to convert this organotrihalosilane into the desired diorganodihalosilane at virtually 100% efficiency of conversion without producing any substantial quantity of the triorganohalosilane or tetraorganosilane.

It is thus seen that the teachings of the present invention have utility as a new process for the production of the desired diorganodihalosilanes at high yield of the order of or better than 95% or can be used to improve the prior art processes and the facilities utilizing them.

As has been mentioned, one of the principal factors in the successful performance of the present invention is control of temperature during reaction as well as subsequent thereto. The prior art direct process characterized by the elevated operational temperatures such as several hundred degrees centigrade involves such high reactivity of the halogen in all involved silane forms that it is impossible to avoid reacting to complete substitution of halogen by the organo radical as for example in the production of tetraethyllead or tetramethylsilicon. When the present reaction is conducted in solution under controlled conditions, however, it is possible to achieve a reaction at lower temperatures, typically below the 100° of the Grignard type of reaction to obtain controlled relative reactivity. Even under the operating conditions employed in the Grignard reaction, there is complete absence of selectivity as to the displacement of halogen atoms so that a statistical distribution of products occurs. It has now been discovered that at substantially lower reaction temperatures than those conventionally used for the production of organo-silanes it is possible to achieve selectivity when the reaction is performed in an appropriate solvent media, with the reactants combined in specific ratios and in the proper order. Although some materials will react in solid form and others will provide inherent solvent nature, many reactions are improved substantially in the solvent media mentioned.

The process of the present invention thus involves radical departure from the prior art in contemplating that under appropriate conditions where a compound $AMR_n$, as hereafter defined is added to a silicon tetrahalide, progressive complete conversion to the organotrihalosilane will first occur, that with additional compound $AMR_n$ this material will in turn be progressively and completely converted into the diorganodihalosilane, that with additional compound $AMR_n$, progressive and complete conversion of the diorganodihalosilane into the triorganohalosilane occurs, and that with additional compound $AMR_n$ progressive and complete conversion of the triorganohalosilane into the tetraorgano form occurs.

The characteristic of these foregoing conversions is that they are irreversible when performed under the conditions employed so that once material of a higher order of organo content is formed it is not possible to drive in the opposite direction. Thus it is essential that care be observed in the addition of compound $AMR_n$ and that localized excesses of compound $AMR_n$ be avoided through the use of adequate agitation.

The basic reaction in accordance with the present invention is represented by the following:

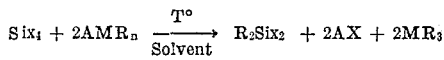

$$SiX_4 + 2AMR_n \xrightarrow[\text{Solvent}]{T°} R_2SiX_2 + 2AX + 2MR_3$$

wherein the compound $AMR_n$ is defined as follows:

A is sodium, potassium, or lithium.
M is aluminum, boron, or zinc.
$R_n$ is selected from the group consisting of alkyl, aryl, alkoxy, aryloxy, halo, hydrogen or combinations. The value of $n$ depends upon the A and M employed typically being 4 for Na and Al. One R of $R_n$ must be an alkyl or aryl, the others can be the same alkyl or aryl or different, as well as various combinations of the members of the same or different categories.

The halide component X of the materials can be any halide, typically chlorine or fluorine. In view of the breadth of the basic invention as set forth, however, it is to be understood that the X is defined as being broad enough to include all halogens as well as hydrogen and combinations including halogens and organics. The specification of the X at this point is thus made sufficiently broad to include the application of the basic selective reaction to a "clean up" of the by-product $RSiCl_3$ produced by the prior are direct process and Gringnard reaction by means of which the organotrihalosilane is converted to the diorganodihalosilane.

The following silicon compounds are useful for $SiX_4$: silicon tetrachloride, silicon tetrafluoride, silicon tetrabromide, silicon tetraiodide or combinations thereof such as dichlorodifluorosilicon, bromotrichlorosilicon, together with materials such as methyltrichloro silane, ethyltrichlorosilane, methyltrifluorosilane, ethyltrifluorosilane, phenyltrichlorosilane, benzyltrichlorosilane, methoxytrichlorosilane, ethoxytrichlorosilane, isopropoxytrichlorosilane, and diacetodichlorosilane.

Similar compounds of germanium, tin, antimony and bismuth may be substituted for the typical silicon compounds.

Typical compounds $AMR_n$ are: lithium aluminum tetramethyl, lithium aluminum tetraethyl, lithium methoxytrimethylaluminum, lithium ethoxytrimethylaluminum, lithium t-butoxytrimethylaluminum, lithium dimethyldi-t-butoxyaluminum, lithium diethyldiethoxyaluminum, lithium aluminum tetraphenyl, lithium aluminum trimethylphenyl, lithium dimethylaluminumdiphenyl, lithium aluminum isopropoxymethyl, lithium aluminum triethoxymethyl, lithium aluminum trichlorophenyl.

Other compounds $AMR_n$ are: sodium aluminum tetramethyl, sodium aluminum tetraethyl, sodium methoxytrimethylaluminum, sodium ethoxytrimethylaluminum, sodium t-butoxytrimethylaluminum, sodium dimethyldi-t-butoxyaluminum, sodium diethyldiethoxyaluminum, sodium aluminum tetraphenyl, sodium aluminum trimethylphenyl, sodium dimethylaluminumdiphenyl, sodium aluminum isopropoxymethyl, sodium aluminum triethoxymethyl, sodium aluminum trichlorophenyl.

Other typical compounds $AMR_n$ are: sodium boron tetramethyl, sodium boron tetraethyl, sodium boron methoxytrimethyl, sodium boron ethoxytrimethyl, sodium boron t-butoxytrimethyl, sodium boron dimethyldi-t-butoxy, sodium boron diethyldiethoxy, sodium boron tetraphenyl, sodium boron trimethylphenyl, sodium boron dimethyldiphenyl, sodium boron isopropoxymethyl, sodium boron triethoxymethyl, sodium boron trichlorophenyl.

Other typical reactants $AMR_n$ are: potassium aluminum tetramethyl, potassium aluminum tetraethyl, potassium methoxytrimethylaluminum, potassium ethoxytrimethylaluminum, potassium t-butoxytrimethylaluminum, potassium dimethyldi-t-butoxyaluminum, potassium diethyldiethoxyaluminum, potassium aluminum tetraphenyl, potassium aluminum trimethylphenyl, potassium dimethylaluminumdiphenyl, potassium aluminum isopropoxymethyl, potassium aluminum triethoxymethyl, potassium aluminum trichlorophenyl.

Other typical reactants $AMR_n$ are: sodium trimethylzinc, sodium triethylzinc, sodium triphenylzinc, lithium trimethylzinc, lithium triethylzinc, lithium triphenyl zinc, potassium trimethylzinc, potassium triethylzinc, potassium triphenylzinc.

Other typical reactants $AMR_n$ are: lithium aluminum trimethylhydride, lithium aluminum triisopropoxyhydride, lithium aluminum trichlorohydride, sodium aluminum trimethylhydride, sodium aluminum triisopropoxyhydride, sodium aluminum trichlorohydride, potassium aluminum trimethylhydride, potassium aluminum triisopropoxyhydride, potassium aluminum trichlorohydride, sodium trimethylborane, potassium triisopropoxyborane, sodium trichloroborane.

The mixed metal salts react readily with silicon halide or silicon alkoxide bonds to replace halogen attached to the silicon in the molar proportion of the complex salt reactant.

In the basic material $AMR_n$ if the R's are different such as $AMR_2R'_2$
where
R=alkyl or aryl
R' is equal to alkyl or aryl but different from R, there is satistical chance for either group to attach to the silicon in substitution of the X. For example,

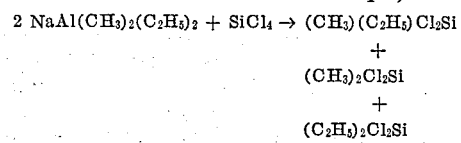

or,

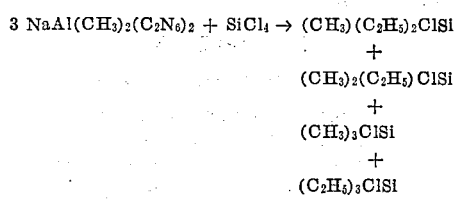

The reactants set forth in the foregoing are required to be added in a specific manner; namely, the compound $AMR_n$ is added to the $SiX_4$ progressively and with adequate agitation, to avoid the existence of excess compound $AMR_n$ in localized regions of the reactor.

The temperature of the reaction is specified broadly as being from about −20° to about +50° C., preferably from about 0° to about +20° C. and typically about 10° C. The basic requirement is that the temperature be such as to "spread" the reactivity of the halogen in the various substituted silane compounds to achieve selective reactivity of the X in the higher order X-compounds over that in the lower order X-compounds despite the fact that a 90% efficiency envisions the fact that the lower order substituted X-silane will be present in a typical 9:1 ratio relative to the higher order X-silane.

The selectivity of production of organohalosilanes in accordance with the present invention is affected to a profound extent by the proportion of the reactants employed. Thus in adding the compound $AMR_n$ to the silicon halide, attention must be given to the correct proportions depending upon the unit value reduction of X between the reactant $SiX_4$ and the desired product. The mole ratio of the reactants is precisely 1:1 per substituted X. Thus the conversion of tetrahalosilane to trihalo is a unit reduction and requires one mole of compound $AMR_n$ per mole of silicon tetrahalide to carry the reaction from the first level to completion at the second level. For complete conversion to the diorganodihalo, a two unit reduction from $SiX_4$, two moles of the compound $AMR_n$ are required per mole of silicon tetrachloride.

Since the reactions are irreversible, inadequacy of mixing may result in localized excesses of compound $AMR_n$ in the reaction mass. This causes the production of some material of a higher degree of substitution than desired which cannot be reconverted to the desired lower level of substitution except through some other conversion scheme. To minimize this condition it may be desirable in some instances to employ a slight deficiency of compound $AMR_n$ relative to that required for complete conversion to any particular level of substitution, thereby deliberately producing incomplete conversion to the level desired, and to separate the material incompletely converted for subsequent recycle.

The foregoing reaction is preferably performed in a solvent medium. The particular solvents employed have substantial effect upon the reaction, the rates, and the yield, as well as the optimum reaction temperature and the recovery of the product. However, in general the solvents are selected from materials which are solvents for the compound $AMR_n$ although not necessarily solvents for other materials that might be present.

Thus several broad classes of solvents may be set forth, the first being ethers such as diethylether, tetrahydrofuran and the various polyalkyl ethers of the ethylene glycols such as the dimethylether of diethyleneglycol, the dimethylether of ethyleneglycol, the diethylether of diethyleneglycol, the methylethylether of diethyleneglycol, the benzylethylether of diethyleneglycol, and various ethers of triethyleneglycol and higher order materials.

The second broad class of solvents is identified as hydrocarbons; aromatics, such as toluene and benzene; aliphatics, such as octane, decane, and tetradecane; and unsaturates, such as tetradecene, hexadecene, and octene.

A third general category of solvents includes mixtures of hydrocarbons and ethers which would in general be desired to permit use of hydrocarbon solvents which are not themselves solvents for the compound $AMR_n$ but which can be used with sufficient ether to complex with the compound $AMR_n$ to produce solution. Typically such complexing would involve a 1:1 mole ratio of ether to the compound $AMR_n$.

The fourth general category of solvents suitable for conducting the reaction includes the amines such as pyridine, and N,N-dimethyl aniline.

EXAMPLE I

Preparation of $(CH_3)_2SiCl_2$ from $MeCl_3Si$ 2 parts of $NaAl(CH_3)_4$ was dissolved in 20 parts dimethyl carbitol and added dropwise with stirring to a solution of 3 parts of $MeSiCl_3$ in 5 parts of dimethyl carbitol at 50° C. During this addition, insoluble NaCl precipitated.

The resulting material was distilled below 50° under vacuum, to recover silicon compounds as overhead.

The analysis by VPC of the overhead showed 85% dimethyldichlorosilane, 10% trimethylchlorosilane, 5% methyltrichlorosilane.

EXAMPLE II

Preparation of $(CH_3)(C_2H_5)SiCl_2$ from $MeCl_3Si$ 12.72 parts of $NaAl(C_2H_5)_4$, (90% of theory) was dissolved in 75 parts dimethyl Carbitol. This solution was added dropwise with stirring to a solution of 12.7 parts of methyltrichlorosilane in 10 parts of dimethyl Carbitol at 25° C. During the addition insoluble sodium chloride precipitated. The resulting material was distilled and a cut taken from 70–100° C. The analysis by mass spectrometer showed 94% methylethyldichlorosilane, 4% methyltrichlorosilane, 2% dimethyl Carbitol.

EXAMPLE III

Preparation of diethyldichlorosilane 29 parts of NaAl($C_2H_5$)$_4$ was dissolved in 100 parts of dimethyl Carbitol. This solution was added slowly with stirring to 14.8 grams of silicon tetrachloride at −10° C. During the addition insoluble sodium chloride precipitated. This was stirred for an additional hour. A cut was taken at 130–140° C. Analysis of the solution showed by mass spectrometer 60.5% diethyldichlorosilane, 2.1% triethylchlorosilane, and 37.3% dimethyl Carbitol.

EXAMPLE IV

Preparation of dimethyldidecylsilane 32 parts of sodium aluminum tetradecyl was added to 3.2 parts of dimethyldichlorosilane in 90 parts toluene slowly and stirred one hour at 10° C. During the reaction sodium chloride precipitated. Toluene was removed by distillation below 50° C. under vacuum. Viscous oil was obtained. Analysis showed it to be 85% dimethyldidecylsilane.

EXAMPLE V

Preparation of dimethyldichlorosilane 14.2 parts sodium aluminum triisopropoxymethyl was added to 5 parts of silicon tetrachloride in 50 parts dimethyl Carbitol slowly and stirred one hour at 25° C. Sodium chloride precipitated. Dimethyldichlorosilane was recovered by distillation.

EXAMPLE VI

Preparation of diethyldichlorosilane 8.8 parts sodium tetraethyl boron is added to 5 parts of silicon tetrachloride in 50 parts dimethyl Carbitol slowly and stirred one hour at 15° C. Sodium chloride precipitates. Diethyldichlorosilane is recovered by distillation below 50° C. at reduced pressure.

EXAMPLE VII

Preparation of diethyldichlorosilane 10.3 parts sodium triethylzinc is added to 5 parts of silicon tetrachloride in 100 parts toluene slowly and stirred one hour at 15° C. Sodium chloride precipitates. Diethyldichlorosilane is recovered by distillation below 50° at reduced pressure.

EXAMPLE VIII

Preparation of diphenyldichlorosilane 20.6 parts sodium boron tetraphenyl is added to 5 parts of silicon tetrachloride in 50 parts dimethyl Carbitol slowly and stirred for one hour at 25° C. Sodium chloride precipitates. Diphenyldichlorosilane is recovered by distillation below 50° at reduced pressure.

EXAMPLE IX

Preparation of dimethyldichlorosilane 108 parts of sodium aluminum tetramethyl in dimethyl Carbitol was prepared in situ by slowly adding 94 parts of trimethylaluminum to 25 parts of sodium (slight excess) in 500 parts dimethyl carbitol at a temperature of about 100–110° C. with vigorous stirring during 1 hour. This mixture without purification was added to 81.5 grams of silicon tetrachloride slowly at 22° C. with stirring for one hour. Sodium chloride precipitated.

Part of the mixture was distilled at 8 mm. of mercury pressure. The product contained 69% dimethyldichlorosilane and 31% trimethylchlorosilane.

EXAMPLE X

A part of the mixture prepared in the reaction of Example IX was distilled at 760 mm. of mercury pressure (1 atmosphere). The product contained 14% tetramethylsilane, 86% trimethylchlorosilane and 0.3% dimethyldichlorosilane. Comparison of the results of Examples IX and X indicates that further reaction occurred during distillation at the higher pressure of Example X.

EXAMPLE XI

Preparation of dimethyldichlorosilane 73.5 parts of sodium aluminum tetramethyl in 350 parts of dimethyl Carbitol was added to 56.6 parts of silicon tetrachloride slowly at 23° C. with stirring for one hour. Sodium chloride precipitated.

Part of the resulting mixture was distilled at 8 mm. of mercury pressure, reading a final bottom temperature of 60° C. The product contained 94% dimethyldichlorosilane, 2% methyltrichlorosilane, and 4% trimethylchlorosilane.

EXAMPLE XII

Part of the resulting mixture prepared in the reaction of Example XI was distilled at 760 mm. of mercury pressure, reading a final bottom temperature of 167° C. The product contained 44% dimethyldichlorosilane, 50% trimethylchlorosilane and 6% tetramethylsilane.

EXAMPLE XIII

Preparation of dimethyldichlorosilane

A resulting reaction mixture was prepared as in Example XI except the reaction temperature was 60° C.

Part of the resulting reaction mixture was distilled at 20 mm. of mercury pressure, reading a final bottoms temperature of 80° C. The product contained 73% dimethyldichlorosilane, 26% trimethylchlorosilane and 1% tetramethylsilane.

EXAMPLE XIV

Part of the resulting reaction mixture of Example XIII was distilled at 760 mm. of mercury pressure, reaching a final bottoms temperature of 168° C. The product contained 24% dimethyldichlorosilane, 63% trimethylchlorosilane and 13% tetramethylsilane. Comparison of results of Example XIII indicates further reaction occurred during distillation.

EXAMPLE XV

Preparation of trimethylchlorosilane

Part of the resulting reaction mixture of Example XIII was flash distilled at 760 mm. of mercury pressure to a final temperature of 163° C. The product contained 96% trimethylchlorosilane and 3% tetramethyl. Results compared with Example XIV indicate complete conversion of dimethyldichlorosilane to trimethylchlorosilane, but virtual absence of conversion to tetramethylsilane due to the short duration of time at the elevated distillation temperature.

Similar desirable results are obtained with other materials of the classes set forth when reacting and recovering under the specified conditions of proportion, solvent, and temperature.

From the foregoing it is obvious that considerable variation is possible in the practice of the invention without exceeding the scope thereof as defined in the appended claims.

What is claimed is:

1. The process for the selective production of organohalosilanes which includes adding a compound having the formula:

$$AMR_n$$

wherein,

A is an alkali metal having an atomic number of from 3 to 19, both inclusive,

M is selecetd from the group consisting of aluminum, boron and zinc,

R is individually selected from the group consisting of hydrocarbyl radicals, hydrocarbyloxy radicals, halogen atoms and the hydrogen atom, at least one R being selected from the class of radicals consisting of alkyl, aralkyl, aryl, and alkaryl, n is an integer exceeding the valence of M by one, to a halo silane having at least two halogen atoms bonded to the silicon atom, while maintaining the reaction temperature from about −20° to about +50° C., the amount of said compound $AMR_n$ added being 1 mol per each mol equivalent of halogen being displaced from said silicon atom.

2. The process for the selective production of organohalosilanes which comprises:

incrementally adding a compound having the formula:

$$AMR_n$$

wherein,

A is an alkali metal having an atomic number of from 3 to 19, both inclusive,

M is selected from the group consisting of aluminum, boron and zinc,

R is individually selected from the group consisting of hydrocarbyl radicals, hydrocarbyloxy radicals, halogen atoms and the hydrogen atom, at least one R being selected from the class of radicals consisting of alkyl, aralkyl, aryl, and alkaryl, n is an integer exceeding the valence of M by one, to a halosilane having the formula:

$$R_a'SiX_b$$

wherein, each R' is individually selected from the group consisting of hydrocarbyl radicals, hydrocarbyloxy radicals and the hydrogen atom, X is a halogen atom, a is 0, 1, or 2, b is an integer of from 2–4, the total of $a+b$ being 4, while maintaining the reaction temperature from about −20° to about +50° C, the amount of said compound so added being one mole thereof per mole of said halosilane for each unit reduction in the value of "b," said amount being insufficient to replace all of the halogen atoms in said halosilane.

3. The process of claim 2 wherein A is sodium.

4. The process of claim 2 wherein M is aluminum and n is 4.

5. The process of claim 2 wherein A is sodium, M is aluminum and n is 4.

6. The process of claim 2 wherein a is 0 and b is 4.

7. The process of claim 2 wherein a is 1 and b is 3.

8. The process of claim 2 wherein the temperature is from about 0° to about +20° C.

9. The process of claim 2 further characterized in that the reaction is conducted in an inert liquid reaction medium.

10. The process of claim 2 further characterized in that the reaction is conducted in a solvent for said compound.

11. The process of claim 2 further characterized in that the reaction is conducted in a solvent for said compound selected from the group consisting of cyclic ethers, polyethers, hydrocarbons, mixtures of said ethers and hydrocarbons, and amines.

12. The process of claim 2 further characterized in that the reaction is conducted in tetrahydrofuran.

13. The process of claim 2 further characterized in that the reaction is conducted in the dimethylether of diethylene glycol.

14. The process of claim 2 further characterized in that the reaction is conducted in the diethylether of diethylene glycol.

15. The process of claim 2 wherein A is potassium.

16. The process of claim 2 wherein A is lithium.

17. The process of claim 2 wherein M is boron and n is 4.

18. The process of claim 2 wherein M is aluminum and n is 4, and A is potassium.

19. The process of claim 2 wherein M is zinc and n is 3.

20. The process of claim 2 wherein A is potassium, M is aluminum, n is 4, X is chlorine, a is 0 and b is 4.

21. The process of claim 2 wherein A is potassium, M is aluminum, n is 4, X is chlorine, a is 1 and b is 3.

22. The process of claim 2 wherein A is sodium, M is boron, n is 4, X is chlorine, a is 0 and b is 4.

23. The process of claim 2 wherein A is sodium, M is boron, n is 4, X is chlorine, a is 1 and b is 3.

24. The process of claim 2 wherein A is sodium, M is boron, n is 4, X is fluorine, a is 0 and b is 4.

25. The process of claim 2 wherein A is sodium, M is boron, n is 4, X is fluorine, a is 1 and b is 3.

26. The process of claim 2 wherein A is sodium, M is zinc and n is 3, a is 0 and b is 4.

27. The process of claim 2 wherein A is sodium, M is zinc and n is 3, a is 1 and b is 3.

28. The process of claim 2 further characterized in that the reaction is conducted in a liquid medium and recovery of the product is performed at a temperature which does not exceed the reaction temperature.

29. In the recovery of an organohalosilane the process of distillation at a temperature from about −20 to about +50° C.

30. In the recovery of an organohalosilane the process of distillation at a temperature from about 0 to +20° C.

31. In the recovery of an organohalosilane the process of distillation from a solvent at a temperature of −20 to +50° C.

32. In the recovery of an organohalosilane the process of distillation from a solvent at a temperature of 0 to +20° C.

33. The process for the selective production of organohalosilanes which comprises:

incrementally adding a compound having the formula:

$$NaAlR_4$$

wherein,

R is individually selected from the group consisting of hydrocarbyl radicals, hydrocarbyloxy radicals, halogen atoms and the hydrogen atom, at least one R being selected from the class of radicals consisting of alkyl, aralkyl, aryl, and alkaryl, to a halosilane having the formula:

$$SiCl_4$$

while maintaining the reaction temperature from about −20° to about +50° C., the amount of said compound so added being one mole thereof per mole of said halosilane for each unit reduction in the number of atoms of chlorine per mole of silicon, said amount being insufficient to replace all of the chlorine atoms in said halosilane.

34. The process for the selective production of organohalosilanes which comprises:

incrementally adding a compound having the formula:

$$NaAlR_4$$

wherein,

R is individually selected from the group consisting of hydrocarbyl radicals, hydrocarbyloxy radicals, halogen atoms and the hydrogen atom, at least one R being selected from the class of radicals consisting of alkyl, aralkyl, aryl, and alkaryl, to a halosilane having the formula:

$$R'SiCl_3$$

wherein, each R' is individually selected from the group consisting of hydrocarbyl radicals, hydrocarbyloxy radicals and the hydrogen atom.
while maintaining the reaction temperature from about —20° C. to about +50° C.,
the amount of said compound so added being one mole thereof per mole of said halosilane for each unit reduction in the number of atoms of chlorine per mole of silicon,
said amount being insufficient to replace all of the chlorine atoms in said halosilane.

35. The process for the selective production of organohalosilanes which comprises:
incrementally adding a compound having the formula:

$$NaAlR_4$$

wherein,
R is individually selected from the group consisting of hydrocarbyl radicals, hydrocarbyloxy radicals, halogen atoms and the hydrogen atom, at least one R being selected from the class of radicals consisting of alkyl, aralkyl, aryl, and alkaryl,
to a halosilane having the formula:

$$SiF_4$$

while maintaining the reaction temperature from about —20° to about +50° C.,
the amount of said compound so added being one mole thereof per mole of said halosilane for each unit reduction in the number of atoms of fluorine per mole of silicon,
said amount being insufficient to replace all of the fluorine atoms in said halosilane.

36. The process for the selective production of organohalosilanes which comprises:
incrementally adding a compound having the formula:

$$NaAlR_4$$

wherein,
R is individually selected from the group consisting of hydrocarbyl radicals, hydrocarbyloxy radicals, halogen atoms and the hydrogen atom, at least one R being selected from the class of radicals consisting of alkyl, aralkyl, aryl, and alkaryl.
to a halosilane having the formula:

$$R'SiF_3$$

wherein,
each R' is individually selected from the group consisting of hydrocarbyl radicals, hydrocarbyloxy radicals and the hydrogen atom,
while maintaining the reaction temperature from about —20° C. to about +50° C.,
the amount of said compound so added being one mole thereof per mole of said halosilane for each unit reduction in the number of atoms of fluorine per mole of silicon,
said amount being insufficient to replace all of the fluorine atoms in said halosilane.

37. The process for the selective production of organohalosilanes which comprises:
incrementally adding a compound having the formula:

$$NaAl(CH_3)_4$$

to a halosilane having the formula:

$$SiCl_4$$

while maintaining the reaction temperature from about 0° to about 20° C.,
the amount of said compound so added being one mole thereof per mole of said halosilane for each unit reduction in the number of atoms of chlorine per mole of silicon,
said amount being insufficient to replace all of the chlorine atoms in said halosilane,
said reaction being conducted in tetrahydrofuran and recovery of the product being performed at a temperature from about —20° C. to about +50° C.

38. The process for the selective production of organohalosilanes which comprises:
incrementally adding a compound having the formula:

$$NaAl(CH_3)_4$$

to a halosilane having the formula:

$$CH_3SiCl_3$$

while maintaining the reaction temperature from about 0° to about 20° C.,
the amount of said compound so added being one mole thereof per mole of said halosilane for each unit reduction in the number of atoms of chlorine per mole of silicon,
said amount being insufficient to replace all of the chlorine atoms in said halosilane,
said reaction being conducted in tetrahydrofuran and recovery of the product being performed at a temperature from about —20° C. to about +50° C.

39. The process for the selective production of organohalosilanes which comprises:
incrementally adding a compound having the formula:

$$NaAl(CH_3)_4$$

to a halosilane having the formula:

$$SiF_4$$

while maintaining the reaction temperature from about 0° to about 20° C.,
the amount of said compound so added being one mole thereof per mole of said halosilane for each unit reduction in the number of atoms of fluorine per mole of silicon,
said amount being insufficient to replace all of the fluorine atoms in said halosilane,
said reaction being conducted in tetrahydrofuran and recovery of the product being performed at a temperature from about —20° C. to about +50° C.

40. The process for the selective production of organohalosilanes which comprises:
incrementally adding a compound having the formula:

$$NaAl(CH_3)_4$$

to a halosilane having the formula:

$$CH_3SiF_3$$

while maintaining the reaction temperature from about 0° to about 20° C.,
the amount of said compound so added being one mole thereof per mole of said halosilane for each unit reduction in the number of atoms of fluorine per mole of silicon,
said amount being insufficient to replace all of the fluorine atoms in said halosilane,
said reaction being conducted in tetrahydrofuran and recovery of the product being performed at a temperature from about —20° C. to about +50° C.

41. The process for the selective production of organohalosilanes which comprises:
incrementally adding a compound having the formula:

$$NaAlR_4$$

wherein,
R is individually selected from the group consisting of hydrocarbyl radicals, hydrocarbyloxy radicals, halogen atoms and the hydrogen atom, at least one R being selected from the class of radicals consisting of alkyl, aralkyl, aryl, and alkaryl,
to a halosilane having the formula:

$$R_a'SiX_b$$

wherein,
each R' is individually selected from the group consisting of hydrocarbyl radicals, hydrocarbyloxy radicals and the hydrogen atom,
X is a halogen atom,
$a$ is 0, 1, or 2,
$b$ is an integer of from 2-4, the total of $a+b$ being 4,
while maintaining the reaction temperature from about $-20°$ to about $+50°$ C.,
the amount of said compound so added being one mole thereof per mole of said halosilane for each unit reduction in the value of $b$,
said amount being insufficient to replace all of the halogen atoms in said halosilane.

References Cited

UNITED STATES PATENTS

| | | |
|---|---|---|
| 2,859,229 | 11/1958 | Blitzer et al. _____ 260—437 |
| 2,921,951 | 1/1960 | Jenkner. |
| 3,057,894 | 10/1962 | Robinson _____ 260—448.2 XR |
| 3,137,718 | 6/1964 | Jenkner. |

FOREIGN PATENTS

| | | |
|---|---|---|
| 900,132 | 7/1962 | Great Britain. |

TOBIAS E. LEVOW, *Primary Examiner.*

P. F. SHAVER, *Assistant Examiner.*